(12) United States Patent
Choi et al.

(10) Patent No.: US 8,323,535 B2
(45) Date of Patent: Dec. 4, 2012

(54) PHOTOCHROMIC COMPOSITIONS AND PHOTOCHROMIC FILMS

(75) Inventors: Hyeon Choi, Daejeon (KR); Jee-Seon Kim, Seoul (KR); Woo-Sung Kim, Daejeon (KR); Young-Jun Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/740,965

(22) PCT Filed: Oct. 31, 2008

(86) PCT No.: PCT/KR2008/006455
§ 371 (c)(1),
(2), (4) Date: Aug. 3, 2010

(87) PCT Pub. No.: WO2009/057980
PCT Pub. Date: May 7, 2009

(65) Prior Publication Data
US 2010/0295003 A1    Nov. 25, 2010

(30) Foreign Application Priority Data

Nov. 1, 2007 (KR) ........................ 10-2007-0110818

(51) Int. Cl.
*G02B 5/23* (2006.01)
*G02C 7/02* (2006.01)

(52) U.S. Cl. .... 252/586; 252/582; 296/84.1; 296/96.19; 296/97.1; 296/216.01; 351/159.01; 359/241; 359/242; 359/267; 359/275; 428/137; 522/13; 522/100; 522/101; 522/103; 522/150; 522/153; 522/167; 523/106; 523/108; 526/204

(58) Field of Classification Search ............... 522/100, 522/101, 13, 18, 102, 103, 153, 150, 167, 522/75, 181; 252/582, 586, 588, 589; 264/1.1, 264/1.27, 1.32, 1.36, 494, 496; 359/241, 359/242, 244, 265, 267, 275; 351/159, 160 R, 351/162, 163, 159.01; 523/106, 108, 135; 526/204; 428/137; 296/216.01, 84.1, 96.19, 296/97.1

See application file for complete search history.

(56) References Cited

U.S. PATENT DOCUMENTS

| | | | |
|---|---|---|---|
| 5,776,376 A * | 7/1998 | Nagoh et al. | ................. 252/586 |
| 6,002,511 A | 12/1999 | Varaprasad | |
| 6,022,496 A | 2/2000 | Kawabata et al. | |
| 6,933,325 B2 * | 8/2005 | Zheng et al. | ................. 522/100 |
| 2007/0065633 A1 | 3/2007 | Mori et al. | |
| 2008/0058444 A1 | 3/2008 | Tanaka et al. | |

FOREIGN PATENT DOCUMENTS

| | | |
|---|---|---|
| JP | 08-320534 A | 12/1996 |
| KR | 10-1999-0043979 A | 6/1999 |
| KR | 10-2004-0111328 | 12/2004 |
| KR | 10-2007-0084049 A | 8/2007 |
| WO | WO 97/06944 | 2/1997 |
| WO | WO97/21122 * | 6/1997 |
| WO | WO 97/21122 A1 | 6/1997 |

* cited by examiner

*Primary Examiner* — Bijan Ahvazi
(74) *Attorney, Agent, or Firm* — McKenna Long & Aldridge LLP

(57) ABSTRACT

The present invention relates to a photochromic composition comprising multifunctional (meth)acrylate-based monomers having two or more functional groups, a photochromic dye and an aromatic vinyl compound, in which the content of the aromatic vinyl compound is more than 30% by weight and 70% by weight or less, a photochromic film produced by using the same, and a method for producing the photochromic film.

15 Claims, 1 Drawing Sheet

[Fig. 1]
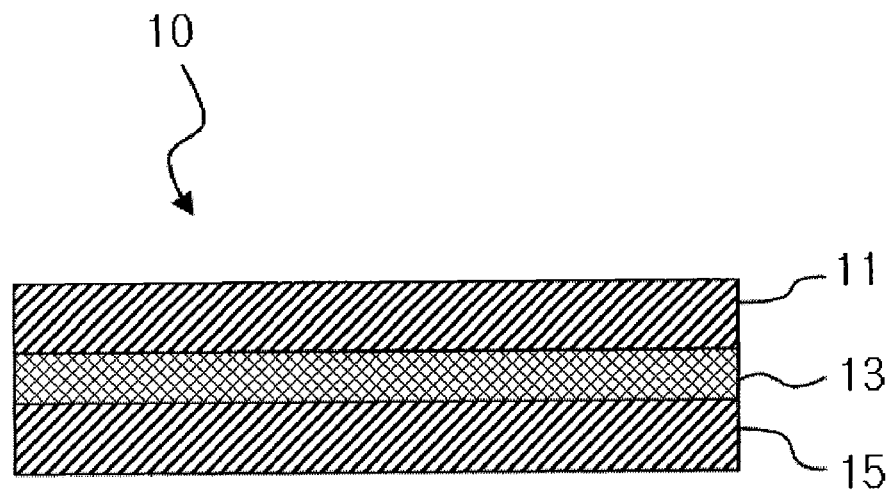
[Fig. 2]
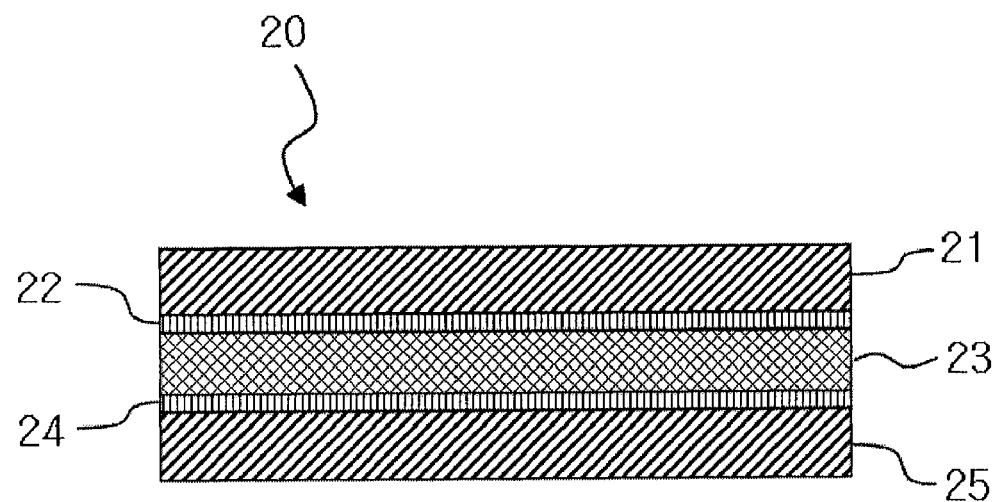

PHOTOCHROMIC COMPOSITIONS AND PHOTOCHROMIC FILMS

This application is a 35 U.S.C. §371 National Stage entry of International Application No. PCT/KR2008/006455, filed Oct. 31, 2008, and claims priority to Korean Application No. 10-2007-00110818, filed on Nov. 1, 2007, which are all hereby incorporated by reference in their entireties.

TECHNICAL FIELD

The present invention relates to a photochromic composition, a photochromic film, and a method for producing the photochromic film. More particularly, the present invention relates to a photochromic composition having improved physical properties in terms of transparency, photochromic efficiency, as well as durability and initial color adjustment property, a photochromic film and a method for producing the photochromic film. This application claims priority from Korea Patent Application No. 10-2007-0110818 filed on Nov. 1, 2007 in the KIPO, the disclosure of which is incorporated herein by reference in its entirety.

BACKGROUND ART

Articles such as glasses for vehicles and buildings which are transparent and exposed to sunlight for a long period of time for their uses have been generally coated with colored films or vacuum-deposited with metals on their surfaces in order to shield a part or light. However, since theses methods always shield visible ray at a predetermined ratio regardless of the light intensity, there are problems in that the field of view becomes dark at night or on a cloudy day.

There are several articles named photochromic films, but most of them are extrusion-molded films prepared by masterbatching resins such as polyethylene, polypropylene, polystyrene, and ABS. Since these films do not have a good transparency, they are generally used as agricultural films which do not require transparency, and impracticable as photochromic films for vehicles requiring a wide field of view.

Korean Patent Publication No. 2003-0089544 discloses a photochromic film prepared by coating a basic polyester (PET) film with a photochromic acrylic-based adhesive to a suitable thickness, which is intended to use as a vehicle tinted film. However, this photochromic film does not have good durability, and thus it is easily damaged.

On the other hand, to improve the performance of photochromic films, various solid additives such as a dye, an initiator, a UV stabilizer, and an antioxidant are added to a binder resin to produce photochromic films. Therefor, it is important that these solid additives have to be well dispersed in the binder resin. When the photochromic film is produced by a solvent-free cell casting method, a pore size of the film matrix can be suitably controlled, and a photochromic film having high durability can be produced, as compared to a method using the polymer itself dissolved in a solvent as a material for the production of the film. However, there is a problem in that the aforementioned solid additives are not dissolved well in the known photochromic composition which is employed in the solvent-free cell casting method. For example, when typical dyes other than photochromic dyes are used for initial color adjustment of the photochromic film, it is difficult to develop a desirable color due to their low solubility to the known photochromic film binder. In addition, in a combination of the known acrylate monomers for the production of the photochromic film, they are problematically filtered out or precipitated due to the low solubility of the typical dyes and UV stabilizer.

DISCLOSURE

Technical Problem

It is an object of the present invention to provide a photochromic composition being excellent in transparency and photochromic efficiency, as well as having improved physical properties such as durability and initial color adjustment property due to high solubility to additives that are added to improve performance of a photochromic film, a photochromic film produced by using the same, and a method for producing the photochromic film.

Technical Solution

In order to achieve the above object, the present invent ion provides a photochromic composition comprising multifunctional (meth)acrylate-based monomers having two or more functional groups, a photochromic dye and an aromatic vinyl compound, in which the content of the aromatic vinyl compound is more than 30% by weight and 70% by weight or less.

Further, the present invention provides a photochromic film comprising multifunctional (meth)acrylate-based monomers having two or more functional groups, a photochromic dye and an aromatic vinyl compound, in which the content of the aromatic vinyl compound is more than 30% by weight and 70% by weight or less.

Further, the present invention provides a transparent article comprising a transparent substrate and the photochromic film provided on at least one side of the transparent substrate.

Further, the present invention provide a method for producing the photochromic film comprising the steps of injecting the photochromic composition into a space that is formed between a pair of substrates and a gasket that is disposed between a pair of substrates, and curing it, in which after the curing step, the gasket has a contraction ratio of 10% or more.

Furthermore, the present invention provides a method for producing the photochromic film comprising the steps of injecting the photochromic composition into a space that is formed between a pair of substrates and a gasket that is disposed between a pair of substrates, and curing it, in which after the curing step, the gasket has a contraction ratio being the same as or higher than that of the photochromic composition.

Advantageous Effects

The photochromic composition according the present invention and the photochromic film produced by using the same are excellent in transparency and photochromic efficiency, as well as have improved physical properties such as durability and initial color adjustment property due to high solubility to additives that are added to the photochromic film. In particular, owing to ingredients and composition of the photochromic composition according to the present invention, a UV stabilizer can be suitably mixed and its content can be increased, thereby improving durability of the photochromic film, and owing to high solubility of typical dyes, initial color adjustment can be easily performed, thereby developing a desirable color.

DESCRIPTION OF DRAWINGS

FIG. 1 shows a cross-sectional view of an article comprising the photochromic film of the present invention; and FIG. 2 shows a cross-sectional view of an article comprising the photochromic film of the present invention and an adhesive layer.

BEST MODE

Hereinafter, the present invention will be described in detail.

The photochromic film according to the present invention comprises multifunctional (meth)acrylate-based monomers having two or more functional groups and an aromatic vinyl compound in addition to a photochromic dye, characterized in that the photochromic film contains the aromatic vinyl compound of more than 30% by weight and 70% by weight or less, preferably more than 40% by weight and 70% by weight or less.

Since the aromatic vinyl compound is contained within the above range, the solubility of additives added to the photochromic film is increased to improve physical properties of the film, and problems due to precipitation or deposition of the additives can be avoided. For example, owing to ingredients and composition of the photochromic composition according to the present invention, a UV stabilizer can be suitably mixed and its content can be increased, thereby improving durability of the photochromic film. In addition, typical dyes in the photochromic composition according to the present invention have high solubility to develop a desirable color.

In the present invention, the aromatic vinyl monomer may include styrene, styrene derivatives, divinylbenzene, divinylbenzene derivatives or the like. In particular, in the present invention, the styrene or derivative thereof is preferably contained in an amount of more than 30% by weight and 70% by weight or less, more preferably more than 40% by weight and 70% by weight or less, and most preferably more than 40% by weight and 50% by weight or less. If the aromatic vinyl compound contains the styrene or derivative thereof of 30% by weight or less, mechanical properties of the film may be deteriorated.

In the present invention, the photochromic composition is characterized in that it contains multifunctional (meth)acrylate-based monomers having two or more functional groups as a material. As used herein, (meth)acrylate encompasses both acrylate and methacrylate.

Since the photochromic film according to the present invention is formed from the photochromic composition comprising multifunctional (meth)acrylate-based monomers having two or more functional groups, it exhibits low oxygen permeability, and thus is excellent in durability. In particular, the photochromic dye in the photochromic film is a spirooxazine or naphthopyran-based organic compound. The dye undergoes ring-opening and coloration by UV radiation, and undergoes ring-closing and decoloration by stopping UV radiation. When the photochromic dye is a colored ring-open form, photo-oxidation occurs by peroxi radical formed by oxygen, leading to degradation of the compound. Therefore, to improve durability of the film, it is important to reduce the oxygen permeability of the photochromic film.

In the present invention, the multifunctional (meth)acrylate-based monomer having two or more functional groups is used as an ingredient of the photochromic composition, this monomer provides a free volume where changes in the structure of the photochromic dye can occur, and provides a structure to reduce the oxygen permeability. The photochromic film according to the present invention has the oxygen permeability of 300 cc/m$^2$·day·atm or less, and preferably 100 cc/m$^2$·day·atm or less. In addition, the photochromic film according to the present invention has excellent transparency and an optical density (transmittance at $\lambda_{min}$) of 35% or less, and more preferably 20% or less upon coloration.

In the present invention, the photochromic composition has not polymer but monomer as the ingredient to form the film without using solvents, thereby reducing generation of matrix pore during the product ion process, as compared to the product ion process to form films using polymers in solvents. Therefore, the photochromic film according to the present invention has a relatively high density.

Owing to the aforementioned ingredients, the photochromic film according to the present invention has the time, when the transmittance at $\lambda_{min}$ (shortest wavelength) reaches the half of those in initial decolorized state, of 1,000 hrs or more, and preferably 1,500 to 4,000 hrs as a scale of weather-resistant. To measure the time when the transmittance at $\lambda_{min}$ reaches the half of those in initial decolorized state, the optical density can be measured by exposing samples to the test cycle of a irradiance 0.77 W/m$^2$ of 340 nm at 60° C. for 8 hrs and condensation at 50° C. for 4 hrs using UVA fluorescence lamp in an accelerated weathering tester ATLAS UV 2000 (ASTM G 154-99).

In the present invention, the multifunctional (meth)acrylate-based monomer having two or more functional groups includes bisphenol A acrylate monomer; polyalkylene glycol di(meth)acrylate and other multifunctional acrylate monomers, and they are used alone or in combination of two or more. In the present invention, the photochromic composition may contain the multifunctional (meth)acrylate-based monomers having two or more functional groups of 30% by weight or more, and preferably 50% by weight or more.

The bisphenol A acrylate monomer is preferably di(meth)acrylate, in particular, BP4PA (Diacrylate of propylene oxide modified bisphenol A, KYOEISHA Chemical Co. Ltd.).

Examples of the polyalkylene glycol di(meth)acrylate may include bisphenol A ethoxylate di(meth)acrylate having a repeating unit of 2 to 20 ethoxy groups, bisphenol A propoxylate di(meth)acrylate having a repeating unit of 2 to 20 propoxy groups, bisphenol A alkoxylate di(meth)acrylate having a repeating unit of 2 to 20 epoxy and propoxy groups, bisphenol A glycerolate di(meth)acrylate, bisphenol A glycerolate (1 glycerol/phenol) di(meth)acrylate, and mixtures thereof.

Examples of other multifunctional acrylate monomers may include dipentaerythritol hexa acrylate (DPHA), dipentaerythritol hydroxy pentaacrylate, pentaerythritol tetraacrylate, pentaerythritol triacrylate, trimethylene propyl triacrylate (TMPTA), propoxylate glycerol triacrylate, trimethylpropane ethoxy triacrylate, and mixtures thereof.

More specifically, the multifunctional (meth)acrylate-based monomer having two or more functional groups include BP4PA, EGDA (ethlyeneglycoldiacrylate), EGDMA (ethyleneglycoldimethacrylate), DPHA (dipentaerythritol hexa acrylate), and TMPTA (trimethylene propyl triacrylate), in particular, preferably BP4PA, and a mixture of EGDA (ethlyeneglycoldiacrylate) and EGDMA (ethyleneglycoldimethacrylate).

In the present invention, in the case of using divinylbenzene and EGDMA (ethyleneglycoldimethacrylate) with short chains, the amounts of these ingredients are controlled to achieve crosslinking and structure being suitable for film formation. Therefore, the film has a structure having a low permeability to oxygen, thereby improving the durability of the photochromic film.

The photochromic composition according to the present invention contains long chain monomers having 15 or more C—C bonds between the double bonds of the functional groups in an amount of 50% by weight or more, preferably 70% by weight or more, and more preferably 80% by weight or more, based on the total amount of the monomers. Examples of the long chain monomers include BP4PA and 9-EGDA. In addition, the photochromic composition for the production of the photochromic film according to the present invention contains short chain monomers having less than 15 C—C bonds between the double bonds of the functional groups in an amount of less than 50% by weight, based on the total amount of the monomers. Examples of the short chain monomers include EGDMA, DVB, hexaacrylate, pentaacrylate, and triacrylate.

In the present invention, the photochromic dyes known in the art may be used, and exemplified by organic compounds such as spiropyran series, fulgide series, fulgimide series, azo-benzene series, viologen series, spiro-oxazine series, and naphthopyran series. Herein, the compounds having a specific chemical structure are compounds having the chemical structure as a core structure, and encompass compounds having only the chemical structure and derivatives thereof. In the present invention, spiro-oxazine series or naphthopyran series compounds are more preferably used. The photochromic dye may be used in an amount of 0.01% by weight ~5% by weight, and preferably 0.1% by weight ~3% by weight.

To the photochromic composition according to the present invention, the additives known in the art may be added for the final uses within the range not to deteriorate the physical properties. For example, a polymerization initiator, a stabilizer, a UV absorber, an antioxidant, a chain transfer agent, an IR absorber, an anti-foaming agent, an antistatic agent, a release agent or the like may be added in an amount of 0.01% by weight ~5% by weight, respectively.

In particular, azo polymerization initiators such as 2,2-azobisisobutyronitrile, 2,2-(2,4-dimethylisovaleronitrile), 2,2-azobis(4-methoxy-2,4-dimethylvaleronitrile), 1,1-azobis (cyclohexane-1-carbonitrile) or peroxide polymerization initiators such as lauroyl peroxide, methylethylketone peroxide, diisopropylperoxidicarbonate, dicyclohexanperoxidicarbonate may be used to polymerize the monomers.

The antioxidant may include radical scavengers such as phenol series, hydroxylamine series, and lactone series, and the UV absorber may include triazine series, benzotriazole series, and benzophenone series. The stabilizer may include hindered amine light stabilizers. The release agent may include PDMS (polydimethylsiloxanes), polysiloxane polyester copolymer, and fluorine-containing surface treatment composition.

It is preferable that the photochromic film according to the present invention has a thickness of 1 mm or less.

The photochromic film according to the present invention may be formed by extrusion molding, casting, blade, spin coating methods or the like, and most preferably the casting method according to the following described method.

The photochromic film according to the present invent ion may be used for any use known in the art without limitation, for example, glasses for vehicles and buildings, high durability ski goggles, and functional signboard.

In accordance with one aspect of the present invention, the photochromic film according to the present invention may be disposed between two transparent substrates. The photochromic film according to the present invention may be formed, and then adhered to the transparent substrate using an adhesive layer, or the transparent substrate is directly coated with the photochromic composition to form the photochromic film, or the photochromic composition is put between two transparent substrates, and heat and pressure are applied thereto, and thus the photochromic film may be interposed between two transparent substrates.

The transparent substrate may be a glass substrate or plastic substrate, and the glass may be a safety glass or tempered glass. FIGS. 1 and 2 are cross-sectional views of articles comprising the photochromic film according to the present invention. In FIG. 1, the illustrated article 10 has a structure of interposing the photochromic film 13 according to the present invention between two transparent substrates 11, 15. In FIG. 2, the illustrated article 20 has a structure of adhering two transparent substrates 21, 25 and the photochromic film 23 that is provided therebetween by adhesive layers 22, 24.

The present invention also provides a method for producing the photochromic film by using the above described photochromic composition. In accordance with one aspect, the method for producing the photochromic film is characterized by comprising the steps of injecting the photochromic composition into a space that is formed between a pair of substrates and a gasket that is disposed between the pair of substrates, and curing it, in which after the curing step, the gasket has a contraction ratio of 10% or more. In detail, in the case of producing the photochromic film by a casting method, the photochromic film is produced by curing through radical polymerization in closed airtight system. In the curing step, acrylic contraction occurs in a ratio of about 10% in the current processing system. If the acrylic contraction is not compensated with the contraction ratio of the gasket in a thin film having a thickness of 1 mm or less, the film surface wrinkles. Thus, in order to obtain the photochromic film having a thickness of 1 mm or less, of which surface is excellent, the gasket with a contraction ratio of 10% or more must be used. However, in the case of using the gasket with a contraction ratio of more than 50%, air bubbles contained in the gasket are infiltrated into acryl upon polymerization to prevent acrylic polymerization, and to generate defective surface due to bubble influx, or acrylic monomers may leak out.

In accordance with another aspect, the present invention provides a method for producing the photochromic film comprising the steps of injecting the photochromic composition into a space that is formed between a pair of substrates and a gasket that is disposed between a pair of substrates, and curing it, in which after the curing step, the gasket has a contraction ratio being the same as or higher than that of the photochromic composition. In detail, when the cured acrylic sheet is contracted during the curing process, vacuum pressure is generated in empty space, which functions as an attractive force on upper and lower glass plates. If the contraction ratio of the gasket is lower than that of the photochromic composition, vacuum pressure is generated to contract the space between the glass plates in a parabolic form, and thus the film becomes thin along its center. Thus, in the present invention, the gasket with a contraction ratio which is the same as or higher than that of the photochromic composition is used to obtain the photochromic film having a uniform thickness of 1 mm or less, of which surface is excellent. In this regard, the contraction ratio of the used gasket is at least 1 to 10 times higher than that of the photochromic composition.

According to the above production method, the aforementioned photochromic film is produced as a thin film having a thickness of 1 mm or less to provide a film having low thickness variation and no defective surface. The thickness variation may be 30% or less, preferably 10% or less, and more preferably 5% or less.

In the method for producing the photochromic film according to the present invention, the gasket materials are not specifically limited, as long as they are not dissolved in the photochromic composition and have the aforementioned contraction ratio according to the curing. Examples thereof may include foamed polyethylene, foamed polyvinylchloride, foamed PDMS (polydimethylsiloxanes), foamed polystyrene, and foamed urethane. The gasket may be in a hollow or filled form, and its cross section may be round, rectangular, or trapezoid, which may be horn shaped. Those skilled in the art may determine the thickness of the gasket depending on the desired thickness of the film, and the size of the gasket depending on the desired size of the film.

In the present invention, the substrate materials known in the art may be used without limitation, and exemplified by glass, metal, plastic or the like, most preferably glass. In addition, the substrate may have a flat surface, or other specific shapes, if necessary. The desirable thickness of the substrate varies depending on the size and type of the substrate, and should be thick enough to endure bending upon adhesion of the gasket and substrate. For example, if the substrate is a glass substrate having an area of 1 $m^2$, its thickness is preferably 5 mm or more.

If necessary, an adhesive sheet to adhere the gasket to the substrate may be provided between the gasket and substrate, or a sealing film may be used to seal the gasket and substrate.

In the present invention, a surface release agent may be further applied to the surface of the gasket and substrate before injecting the photochromic composition, or the surface release agent may be added to the photochromic composition. The surface release agent may include PDMS (polydimethylsiloxanes), polysiloxane polyester copolymer, and fluorine-containing surface treatment composition.

In the present invention, the conditions for curing the photochromic composition are as follows. The curing process is initiated at atmospheric pressure and 25° C., and the temperature is gradually increased to 100° C. over 2 to 5 hrs. After maintaining the temperature at 100° C. for 1 to 3 hrs, the temperature is decreased to 25° C. over 2 to 5 hrs to cure the film. However, the scope of the present invention is not limited to the conditions, and the curing step may be performed under the conditions known in the art.

The method according to the present invention may further comprise the steps of separating the substrate and gasket and separating the acrylic film, after the curing step.

According to the present method, the film of 20 cm×20 cm may be produced to have a thickness of 1 mm or less, preferably 0.1 to 0.5 mm or less, and more preferably about 0.3 mm. In addition, the film produced according to the present invention has a low thickness variation. The thickness variation may depend on the uses of the film, and preferably 30% or less, more preferably less than 10%.

MODE FOR INVENTION

Hereinafter, the present invention will be described in more detail with reference to Examples and Comparative Example. However, the following examples are for illustrative purposes and are not intended to limit the scope of the present invention.

Example 1

The ingredients in the following Table 1 were mixed together to prepare a photochromic composition. The solubilities of typical dyes and UV stabilizer in the photochromic composition are described in the following Tale 2.

TABLE 1

| Ingredient | Compound | Content (weight ratio) |
|---|---|---|
| Monomer | BP4PA (KYOEISHA) | 40 |
|  | Styrene | 35 |
|  | Divinylbenzene (DVB) | 5 |
|  | 9-EGDA (KYOEISHA) | 20 |
| Polymerization initiator | V-65 (Wacko) | 0.2 |
| Dye | Palatinate Purple (James Robinson) | 1 |
| Stabilizer | HALS (hindered amine light stabilizer)[Tinuvin 144 (Ciba)] | 2 |
| Total |  | 102.9 |

TABLE 2

| Additive | | Content (w/w, %) |
|---|---|---|
| Typical dye Black (Papilion Black S-PT, EASTWELL Co., Ltd) | Magenta | 4.6 |
|  | Yellow | 0.1 |
|  | Blue | 2 |
| Typical dye Black (Papilion Black S-PT, EASTWELL Co., LTD) |  | 2 |
| UV stabilizer |  | 2.5 |

Example 2

The ingredients in the following Table 3 were mixed together to prepare a photochromic composition. The solubilities of typical dyes and UV stabilizer in the photochromic composition are described in the following Tale 4.

TABLE 3

| Ingredient | Compound | Content (weight ratio) |
|---|---|---|
| Monomer | BP4PA (KYOEISHA) | 30 |
|  | Styrene | 51 |
|  | Divinylbenzene (DVB) | 4 |
|  | 9-EGDA (KYOEISHA) | 20 |
| Polymerization initiator | V-65 (Wacko) | 0.2 |
| Dye | Palatinate Purple (James Robinson) | 1 |
| Stabilizer | HALS (hindered amine light stabilizer)[Tinuvin 144 (Ciba)] | 2 |
| Total |  | 102.9 |

TABLE 4

| Additive | | Content (w/w, %) |
|---|---|---|
| Typical dye Black (Papilion Black S-PT, EASTWELL Co., Ltd) | Magenta | 5.2 |
|  | Yellow | 0.3 |
|  | Blue | 2.4 |
| Typical dye Blue (Papilion Blue S-PR, EASTWELL Co., Ltd) |  | 2.5 |
| UV stabilizer |  | 3.2 |

Photochromic films were produced by using the photochromic composition (Example 1) containing the ingredients in Tables 1 and 2 and the photochromic composition (Example 2) containing the ingredients in Tables 3 and 4. In particular, spacers were interposed between the two glass plates with a thickness of 2 mm around their edges to form a space of 300 μm. The photochromic composition was injected into the space between the glass plates, and heat-cured for 6 hrs to mold a film with a thickness of 300 μm. The curing process was initiated at atmospheric pressure and 25°

C., and the temperature is gradually increased to 100° C. over 4 hrs. After maintaining the temperature at 100° C. for 2 hrs, the temperature is decreased to 25° C. over 4 hrs to cure the film.

The initial color of the produced film exhibited a transmission of 40%, and an optical density of less than 20%. The samples were exposed to the test cycle of a irradiance 0.77 W/m² of 340 nm at 60° C. for 8 hrs and condensation at 50° C. for 4 hrs using UVA fluorescence lamp in an accelerated weathering tester ATLAS UV 2000, so as to determine the optical density. The time was measured, when the transmittance at $\lambda_{min}$ of the samples reached the half of those in initial decolorized state, resulting in 2,000 hrs in Example 1 and 2,300 hrs in Example 2.

Comparative Example 1

The ingredients in the following Table 5 were mixed together to prepare a photochromic composition. The solubilities of typical dyes and UV stabilizer in the photochromic composition are described in the following Tale 6.

TABLE 5

| Ingredient | Compound | Content (weight ratio) |
|---|---|---|
| Monomer | BP4PA (KYOEISHA) | 50 |
| | Styrene | 20 |
| | Divinylbenzene (DVB) | 3 |
| | 9-EGDA (KYOEISHA) | 27 |
| Polymerization initiator | V-65 (Wacko) | 0.2 |
| Dye | Palatinate Purple (James Robinson) | 0.7 |
| Stabilizer | HALS (hindered amine light stabilizer) [Tinuvin 144 (Ciba)] | 0.8 |
| Total | | 101.7 |

TABLE 6

| Additive | | Content (w/w, %) |
|---|---|---|
| Typical dye Black (Papilion Black S-PT, Eastwell Co., Ltd) | Magenta | 0.2 |
| | Yellow | 0.034 |
| | Blue | 0.13 |
| Typical dye Blue (Papilion Blue S-PR, EASTWELL Co., Ltd) | | 0.4 |
| UV stabilizer | | 0.87 |

Photochromic films were produced by using the photochromic composition containing the ingredients in Tables 5 and 6 in the same manners as in Examples.

The initial color of the produced film exhibited a transmission of 70%, and an optical density of less than 20%. The samples were exposed to the test cycle of a irradiance 0.77 W/m² of 340 nm at 60° C. for 8 hrs and condensation at 50° C. for 4 hrs using UVA fluorescence lamp in an accelerated weathering tester ATLAS UV 2000, so as to determine the optical density. The time was measured, when the transmittance at $\lambda_{min}$ of the samples reached the half of those in initial decolorized state, resulting in 1,000 hrs. It can be seen that the film of Example 1 has durability twice superior to that of Comparative Example.

The invention claimed is:

1. A photochromic composition comprising multifunctional (meth)acrylate-based monomers having two or more functional groups, a photochromic dye and an aromatic vinyl compound,
wherein the content of the aromatic vinyl compound is more than 30% by weight and 70% by weight or less, and the content of the multifunctional (meth)acrylate-based monomers having two or more function groups is more than 30% by weight,
wherein the multifunctional (meth)acrylate-based monomers having two or more functional group further comprises one or mixtures of two or more selected from the group consisting of dipentaerythritol hexaacrylate (DPHA), dipentaerythritol hydroxy pentaacrylate, pentaerythritol tetraacrylate, pentaerythritol triacrylate, trimethylene propyl triacrylate (TMPTA), propoxyate glycerol triacrylate and trimethylpropane ethoxy triacrylate; and
wherein the photochromic composition further comprises a stabilizer, and the total content of the photochromic due and the stabilizer is 1.5% by weight to 5% by weight.

2. The photochromic composition according to claim 1, wherein the aromatic vinyl compound comprises at least one selected from styrene, styrene derivatives, divinylbenzene, and divinylbenzene derivatives.

3. The photochromic composition according to claim 1, wherein the aromatic vinyl compound comprises styrene or derivatives thereof in an amount of more than 30% by weight and 70% by weight or less.

4. The photochromic composition according to claim 1, wherein the multifunctional (meth)acrylate-haled monomer having two or more functional groups comprises one or mixtures of two or more selected from bisphenol A acrylate monomer and polyalkylene glycol di(meth)acrylate.

5. The photochromic composition according to claim 4, wherein the multifunctional (meth)acrylate-based monomer having two or more functional groups includes BP4PA (di-aerylate of propylene oxide modified bisphenol A), EGDA (ethlyeneglycoldiacrylate) and EGDMA (ethyleneglycoldimethacrylate).

6. The photochromic composition according to claim 1, wherein the photochromic composition comprises long chain monomers having 15 or more C—C bonds between the double bonds of the functional groups in an amount of 50% by weight or more, based on the total amount of the monomers, and short chain monomers having 15 or less C—C; bonds between the double bonds of the functional groups in an amount of less than 50% by weight, based on the total amount of the monomers.

7. The photochromic composition according to claim 1, wherein the photochromic dye is a spiro-oxazine or naphthopyran-based organic compound.

8. The photochromic composition according to claim 1, wherein the photochromic composition further comprises one or more additives selected from the group consisting of a polymerization initiator, a UV absorber, an antioxidant, a chain transfer agent, an IR absorber, an anti-foaming agent, an antistatic agent, and a release agent.

9. A photochromic film formed by curing the photochromic composition according to claim 1.

10. A transparent article, comprising a transparent substrate and the photochromic film according to claim 9 that is provided on at least one side of the transparent substrate.

11. The transparent article according to claim 10, comprising a structure of interposing the photochromic film between two transparent substrates.

12. The transparent article according to claim 11, comprising an adhesive layer that is interposed between the transparent substrate and the photochromic film.

13. The transparent article according to claim 10, wherein the transparent article is glasses for vehicles and buildings, high durability ski goggles, or functional signboard.

14. A method for producing a photochromic film comprising the steps of injecting the photochromic composition according to claim 1 into a space that is formed between a pair of substrates and a gasket
   that is disposed between a pair of substrates, and curing it, wherein after the curing step, the gasket has a contraction ratio of 10% or more.

15. A method for producing a photochromic film comprising the steps of injecting the photochromic composition according to claim 1 into a space that is formed between a pair of substrates and a gasket that is disposed between a pair of substrates, and curing it, wherein after the curing step, the gasket has a contraction ratio being the same as or higher than that of the photochromic composition.

* * * * *